(12) United States Patent
Poplingher

(10) Patent No.: US 6,170,054 B1
(45) Date of Patent: Jan. 2, 2001

(54) METHOD AND APPARATUS FOR PREDICTING TARGET ADDRESSES FOR RETURN FROM SUBROUTINE INSTRUCTIONS UTILIZING A RETURN ADDRESS CACHE

(75) Inventor: Mitchell Alexander Poplingher, Palo Alto, CA (US)

(73) Assignee: Intel Corporation, Santa Clara, CA (US)

(*) Notice: Under 35 U.S.C. 154(b), the term of this patent shall be extended for 0 days.

(21) Appl. No.: 09/193,323

(22) Filed: Nov. 16, 1998

(51) Int. Cl.[7] ........................................... G06F 9/42
(52) U.S. Cl. ........................ 712/242; 712/219; 712/238
(58) Field of Search ................................... 712/242, 243, 712/219, 238

(56) References Cited

U.S. PATENT DOCUMENTS 5,964,868 * 10/1999 Gochman et al. ...................... 712/239

OTHER PUBLICATIONS

IBM Technical Disclosure Bulletin, *Return Address Stack Cache*, vol. 34, No. 11, Apr. 1992, pp. 269–271.*
IBM Technical Disclosure Bulletin, *Subroutine Call/Return Stack*, vol. 30, No. 11, Apr. 1988, pp. 221–225.*
IBM Technical Disclosure Bulletin, *Highly Accurage Subroutine Stack Prediction Mechanism*, vol. 28, No. 10, Mar. 1986, pp. 4635–4637.*
IBM Technical Disclosure Bulletin, *Subroutine Return Address Stack*, vol. 24, No. 7a, pp. 3255–3258.*
Skadron, Kevin et al., *Improving Prediction for Procedure Returns with Return–Address–Stack Repair Mechanisms*, IEEE, 1988, pp. 259–271.*

* cited by examiner

*Primary Examiner*—Richard L. Ellis
(74) *Attorney, Agent, or Firm*—Blakely, Sokoloff, Taylor & Zafman LLP

(57) ABSTRACT

A method of operation in a microprocessor is provided. A return address cache (RAC) is initialized. The RAC includes a portion to store predicted subroutine return addresses (PSRA) and first and second corresponding cache portions to store retired most recently updated (RMRU) ages of the PSRA and speculative most recently updated (SMRU) ages of the PSRA respectively. A PSRA is stored in a portion of the RAC corresponding to a first SMRU age and the SMRU ages are incremented responsive to prediction of a call instruction. A PSRA is read from a portion of the RAC corresponding to a second SMRU age and the SMRU ages are decremented responsive to prediction of a return instruction. Also a microprocessor that includes a return address cache (RAC) is provided. The RAC includes first and second tag portions to store retired most recently updated (RMRU) ages and speculative most recently updated (SMRU) ages respectively. The RAC also includes a data portion to store predicted subroutine addresses (PSRA). The RAC also includes a control logic to cause the RMRU ages to be copied onto corresponding SMRU ages responsive to detection of a branch misprediction.

21 Claims, 6 Drawing Sheets

METHOD AND APPARATUS FOR PREDICTING TARGET ADDRESSES FOR RETURN FROM SUBROUTINE INSTRUCTIONS UTILIZING A RETURN ADDRESS CACHE

BACKGROUND OF THE INVENTION

I. Field of the Invention

The present invention relates to the field of microprocessors. More specifically, the present invention relates to processing of instructions associated with subroutines in pipelined computers.

II. Background Information

The concept of pipelining of instructions in a computer is well known. In a pipeline computer, the processing of instructions such as fetching, decoding, execution, etc., is typically performed in a number of different pipeline stages. Each of the various pipeline stages process different instructions at the same time.

Pipelining is a more efficient method of processing instructions than the alternative waiting for a single instruction to be completely processed before beginning the processing of a second instruction. In the normal flow of a computer program, it is easy to know which instruction is next to enter the pipeline. In most instances, it is the sequentially next instruction that enters the pipeline. For example, an instruction at address A+1 will enter the pipeline after the instruction at address A entered the pipeline. One exception to this sequential flow of control is known as a branch instruction. One type of branch instruction is a "call" to a subroutine. A subroutine is a program or a sequence of instructions that may be "called" to perform the same tasks at different points in a program, or even in different programs.

Subroutines, pose problems for pipelined computers, particularly for those with many stages in the pipeline. Although the instruction which calls for a subroutine may contain enough information to determine which is the next instruction to enter the pipeline (i.e., the first instruction in the called subroutine), the return instruction in the subroutine does not contain such information. Instead, a return instruction needs to pass through all of the stages of the pipeline before the return address is determined from the return instruction. If the computer waited for the return instruction to pass through the pipeline before entering another instruction in the pipeline, a "bubble" would occur in the pipeline behind the return instruction. During a "bubble" there is no meaningful processing of instructions and the performance of the computer is slowed down.

To avoid bubbles, a prediction mechanism known as a return stack buffer has been in use. A return stack buffer stores the return address of a subroutine i.e., the address following the instruction that is causing the subroutine to be called, when a subroutine is called. When the subroutine has completed and control is returned to the main program flow by a return instruction, the return address is located in the stack and provided to the pipeline. The pipeline is then able to return control to the main program flow by entering the proper instruction into the pipeline. By keeping a stack of the return addresses, and using these return addresses to locate the next instruction upon return from the subroutine, bubbles in the pipeline may be eliminated.

A problem with the stack mechanism is the limited size of the stack and the complicated procedures to deal with stack overflows and underflows when there are a large number of subroutines that have been called, i.e., nested subroutines. In other words, if the stack contains twelve locations, only twelve subroutines may be called at one time without resorting to the complicated procedures for stack overflows. Circular buffers have been provided to overcome the problems posed by stacks. However, circular buffers also pose problems when there are more subroutine calls than the number of locations that store return addresses in the circular buffer, as return addresses may be overwritten for nested subroutines. When return addresses are overwritten, prediction of return instructions corresponding to the overwritten return addresses may generate mispredicted, return addresses. Furthermore, circular buffer implementations may not provide the right return addresses for subroutines in cases of misprediction of a branch that is not a call or return.

It is desirable to provide an apparatus and method, for subroutines in pipelined microprocessors, that provide uncorrupted return addresses in case of branch misprediction. It is also desirable that the above-mentioned apparatus and method detect underflow and overflow inaccuracies.

SUMMARY OF THE INVENTION

A method of operation in a microprocessor is disclosed. A return address cache (RAC) is initialized. The RAC includes a portion to store predicted subroutine return addresses (PSRA) and first and second corresponding cache portions to store retired most recently updated (RMRU) and speculative most recently updated (SMRU) ages of the PSRA respectively. A PSRA is stored in a portion of the RAC corresponding to a first SMRU age and the SMRU ages are incremented responsive to prediction of a call instruction. A PSRA is read from a portion of the RAC corresponding to a second SMRU age and the SMRU ages are decremented responsive to prediction of a return instruction.

BRIEF DESCRIPTION OF THE DRAWINGS

The features, aspects and advantages of the present invention will become more fully apparent from the following Detailed Description, appended claims and accompanying drawings in which:

FIGS. 6, 7, 8, 9 and 10 illustrate various examples of a configuration of a RAC in the case of a relatively long subroutine; and FIGS. 11, 12, 13 and 14 illustrate various examples of a configuration of a RAC in the case of a relatively short subroutine.

DETAILED DESCRIPTION OF THE INVENTION

In the following description, numerous specific details are set forth to provide a thorough understanding of the present invention. However, one having ordinary skill in the art may be able to practice the invention without the specific details. In some instances, well-known circuits, structures and techniques have not been shown in detail to avoid unnecessarily obscuring the present invention.

The present invention provides a method and apparatus for handling prediction of return from subroutine instructions in a microprocessor with a relatively deep pipeline. A Return Address Cache (RAC) that stores predicted subroutine return addresses (PSRA) is provided. The method starts with the initialization of the (RAC). The RAC includes a portion storing PSRAs and first and second cache portions storing retired most recently updated (RMRU) ages of the PSRAs and speculative most recently updated (SMRU) ages of the PSRAs. When a call instruction is predicted, a PSRA is stored in a PSRA entry corresponding to a first SMRU age and the SMRU ages are incremented. When a return instruction is predicted, a PSRA is read from a PSRA entry corresponding to a second SMRU age and the SMRU ages are decremented. The microprocessor then starts fetching instructions from memory locations at addresses starting at the PSRA. When a return instruction is retired, the RMRU ages are decremented. When a call instruction is retired the RMRU ages are incremented. When a misprediction is detected, the RMRU ages are copied into corresponding SMRU ages. The present invention provides recovery from branch misprediction by providing a mechanism for updating SMRU and RMRU ages and for copying the RMRU ages into the corresponding SMRU ages, in case of branch misprediction. The correct return addresses are provided after recovery from branch misprediction.

Figure 1:
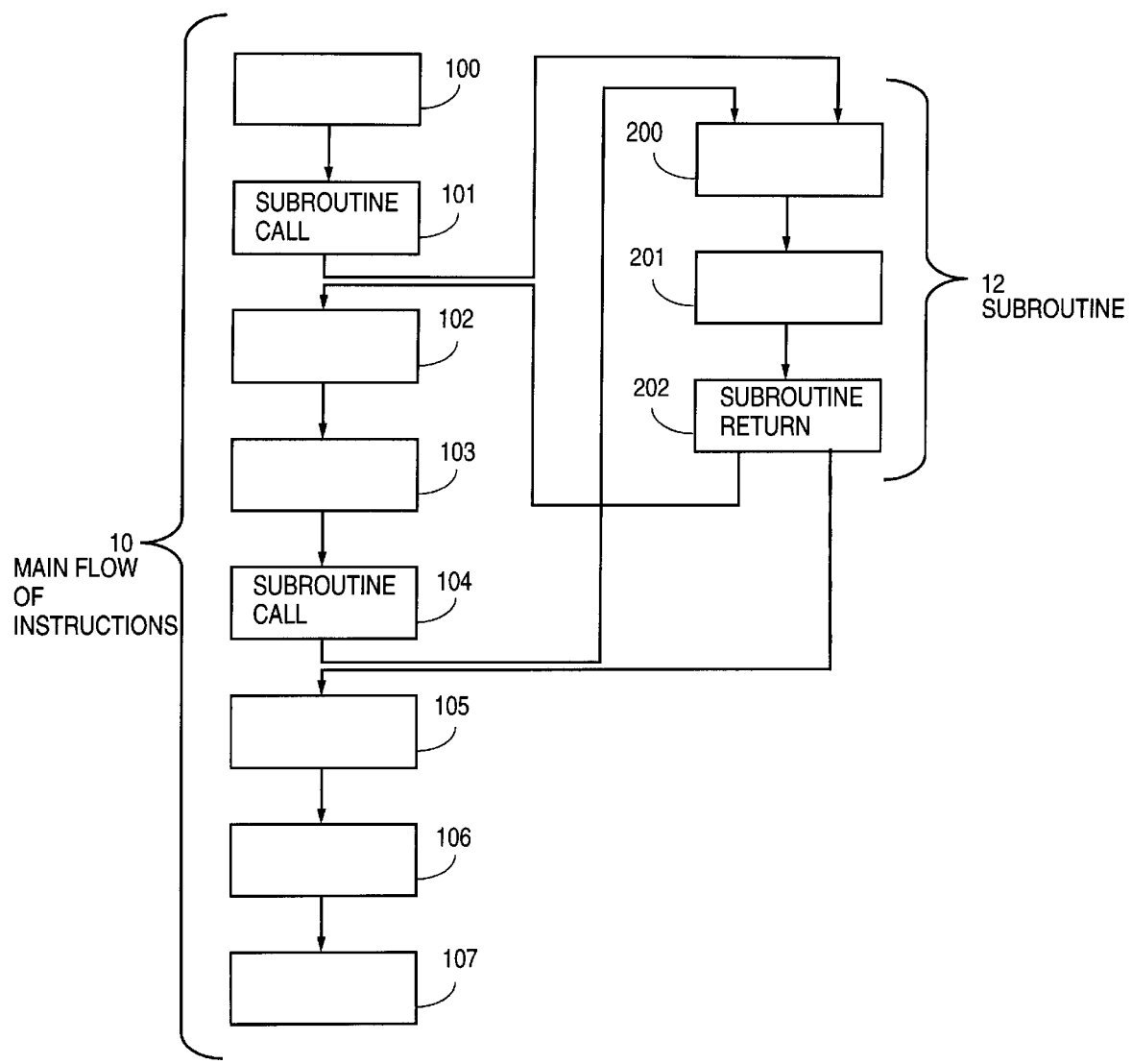
FIG. 1 diagrammatically illustrates a flow of a computer program that may be used in connection with an apparatus and a process according to the present invention.

FIG. 1 diagrammatically illustrates a flow of a computer program that may be used in connection with an embodiment of an apparatus and process according to the present invention. Instructions 100–107 are instructions that make up a main flow of instructions 10. A secondary flow of instructions 200–202 includes a subroutine 12. In the example of FIG. 1, the subroutine 12 is called from one of two instructions 101 and 104. When subroutine 12 is called from instruction 101, for example, the computer executes instructions 200,201 and returns to the main flow 10 with instruction 202. Execution of the main flow 10 begins again at instruction 102. However, if the subroutine 12 was called from instruction 104, the subroutine 12 must return the flow of execution to the main flow 10 at instruction 105. The main flow 10, thus, may be returned to from subroutine 12 at one of two places. In a larger program, it is possible to make the return to the main flow 10 to any number of places.

Since a subroutine may be called from so many different places, every time one returns from the subroutine one may basically return to a different target return address. Therefore, the return address may differ depending on what portion of the program the same subroutine was called. While for every regular branch instruction there is one target, for returns one may have hundreds of targets. Current prediction techniques that utilize the branch target buffer to store the history of a branch may not be efficiently implemented to predict an address or a target address return for a subroutine. This is so as branch target buffers typically store only one return address for any branch, including returns from subroutines.

Figure 2:
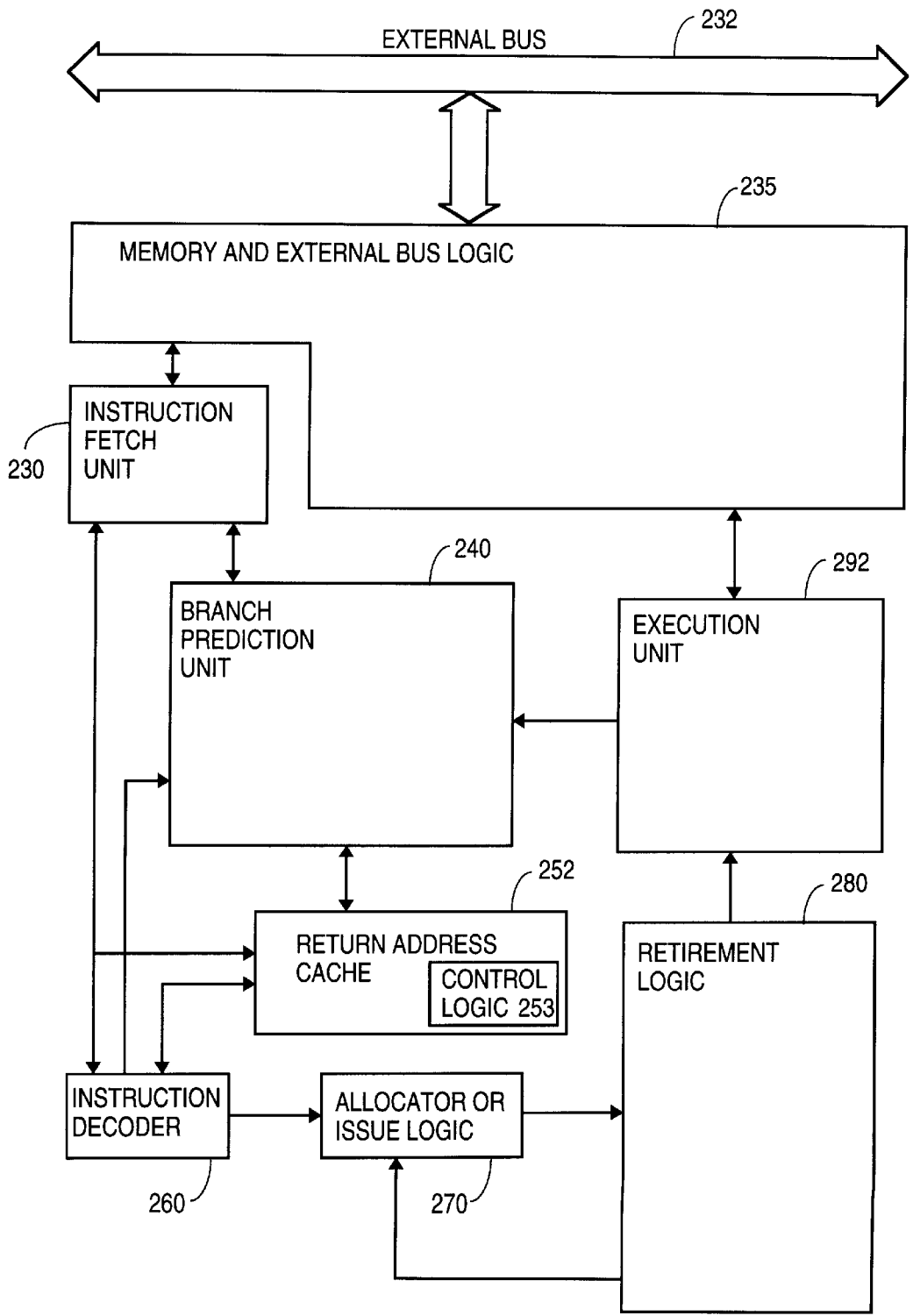
FIG. 2 illustrates in block diagram form, a pipelined microprocessor including an embodiment of a Return Address Cache (RAC) according to the present invention.

FIG. 2 illustrates in block diagram form a pipelined microprocessor 200 including an embodiment of a return address cache (RAC) 252 according to the present invention. In microprocessor 200 depicted in FIG. 2, branch instructions are handled by the following logic circuits: a branch prediction unit (BPU) 240, an instruction decoder 260, a return address cache 252 according to one embodiment of the present invention, a branch execution unit 292, and a retirement logic circuit 280. To minimize pipeline stalls, each of the logic circuits shown in FIG. 2 uses the information that it has available to predict and resolve branch instructions within the instruction stream. At the top of the block diagram of FIG. 2 is a memory and external bus logic 235 that is responsible for loading information into the microprocessor and outputting information from the microprocessor. The memory and external bus logic 235 usually first attempts to load or store from a high speed cache memory (not shown) (here cache memory refers to a hierarchy of cache memories). If the cache memory cannot be used for whatever reason (perhaps due to a cache "miss"), the memory and external bus logic 235 instead accesses a main memory over external bus 232.

Instruction fetch unit 230 is coupled to the memory and external bus logic 235. The instruction fetch unit 230 is responsible for continually fetching new microprocessor instructions and operands for the microprocessor to execute. The instruction fetch unit 230 uses an instruction pointer (IP) to maintain the current fetch address. The fetched microprocessor instructions are fed into the head of the instruction pipeline.

To help fetch the correct instructions, the instruction fetch unit consults the branch prediction unit (BPU) 240. The branch prediction unit (BPU) 240 predicts the existence of branch instructions within the instruction stream and predicts the outcome of each predicted branch instruction.

After the instruction fetch unit 230 fetches each microprocessor instruction, the instruction fetch unit 230 passes each microprocessor instruction to an instruction decoder 260. The instruction decoder 260 is responsible, among other things, for determining what type of microprocessor instruction is received.

Various mechanisms can be used to perform branch prediction. One mechanism utilizes the branch prediction unit (BPU) 240. The branch prediction unit (BPU) 240 predicts a branch outcome and the branch target address for each predicted branch instruction. Branch prediction unit (BPU) 240 maintains a cache that contains information about branch instructions The cache containing the branch information (historical information) is referred to as the branch prediction unit cache (not shown). Each time a branch instruction is resolved by the microprocessor, the branch prediction unit (BPU) 240 records the type of branch instruction, the branch instruction's target address and the outcome of the branch instruction into the branch target buffer cache for future reference. Different branch predictors make predictions at different stages of the pipeline. For example, branch predictors can operate on decoded instructions while others operate on instruction pointers. This invention is described with reference to the latter, but is not limited to this.

Before each instruction fetch, the instruction fetch unit 230 passes a current instruction pointer to the branch prediction unit (BPU) 240 to determine if there is an upcoming branch instruction that directs the microprocessor to a non-sequential address. The branch prediction unit (BPU) 240 examines the branch target buffer cache using the instruction pointer, looking for an upcoming branch instruction. If the branch prediction unit (BPU)finds an upcoming branch instruction, a branch target buffer cache "hit" occurs and the branch prediction unit (BPU) 240 makes a branch prediction using the branch information from the branch target buffer cache.

When a branch target buffer cache "hit" occurs, the branch prediction unit (BPU) 240 reads out the entry that contains the branch information. One of the fields of each branch information entry is a branch type field. The branch prediction unit (BPU) 240 handles the branch prediction differently depending upon what type of branch instruction is predicted. Some of the different types of branch instructions are: conditional branch, return from subroutine, call subroutine, unconditional branch. Call and Return From Subroutine instructions are specific types of branch instructions. These two instructions are marked as different types of branch instruction and the branch prediction unit (BPU) 240 handles these two branch instruction types in a special manner.

When the branch prediction unit (BPU) 240 predicts a Call Subroutine instruction, it predicts a branch to a target address specified by the target field of the branch target buffer cache entry. The branch prediction unit (BPU) 240 places the address of the instruction after the Call Subroutine instruction (a return address) into an entry of the return address cache 252. Moreover, the branch prediction unit (BPU) 240 sets a valid bit (not shown), associated with the entry storing the return address, in the Return Address Cache to indicate that the respective entry contains a valid return address.

When the branch prediction unit (BPU) 240 predicts a return from subroutine instruction, the branch prediction unit (BPU) 240 first checks the valid bit associated with the subroutine return address entry in the return address cache 252. The condition of the valid bit associated with the subroutine return address determines how the branch prediction unit (BPU) 240 predicts a return address for the return from subroutine instruction. If the valid bit is set, the branch prediction unit (BPU) 240 uses the predicted subroutine return address (PSRA) stored in the return address cache 252, to predict the return address of the return from subroutine instruction.

The retirement circuit 280 is responsible for retiring instructions executed by the processor. The retirement circuit 280 prevents instructions, fetched after mispredicted branches, from being committed into permanent state. When the branch execution unit 292 detects a mispredicted branch that is the oldest non-retired instruction and is about to retire, the branch execution unit 292 flushes the microprocessor's pipeline.

Figure 3:
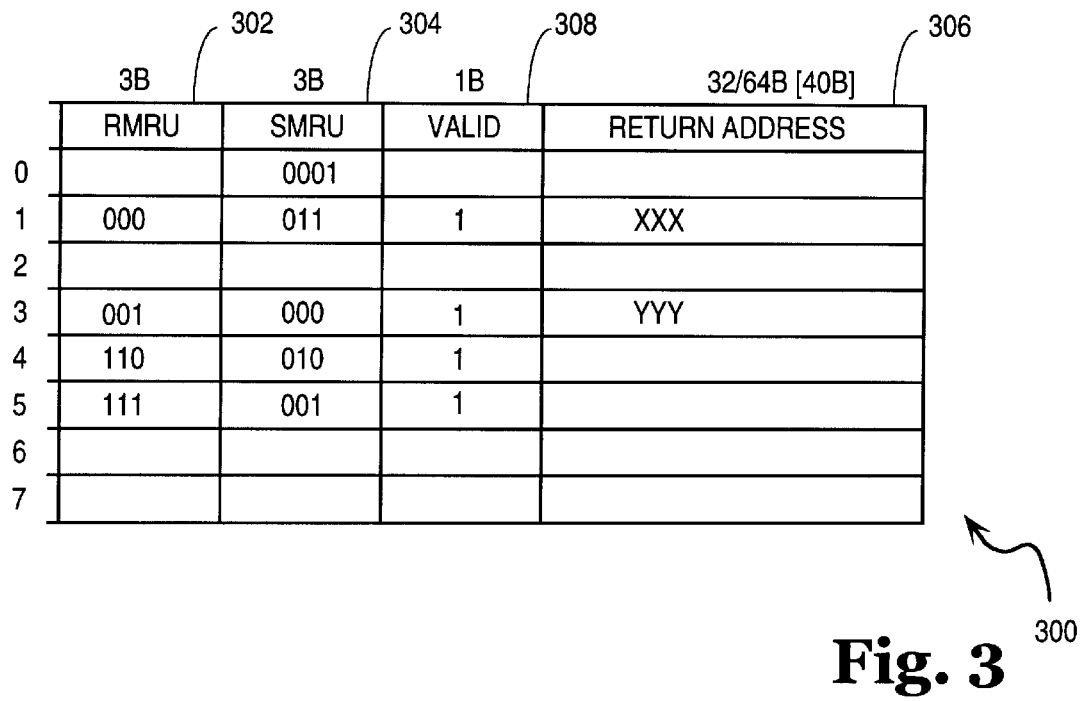
FIG. 3 illustrates in more detail a RAC according to one embodiment of the present invention.

FIG. 3 illustrates in more detail a RAC 300 according to one embodiment of the present invention. RAC 300 is used for storing predicted target addresses of predicted return instructions. One difference between an ordinary fully associative cache and RAC 300 is that RAC 300 has two tag portions 302 and 304. The information entered into the tag entries includes the most recently updated (MRU) ages of predicted subroutine return addresses (PSRA entries). The age of a PSRA entry indicates, relative to other entries, whether a certain PSRA entry has been updated before or after other PSRA entries in the tag portions. The most recent PSRA entry corresponding to the youngest age, updated by a call instruction, is the one that is needed to predict the next return.

RAC 300 includes first and second tag portions 302 and 304, predicted subroutine return address (PSRA) portion 306 that stores predicted subroutine return addresses, and a valid portion 308 that stores valid bits that indicate the status (valid/invalid) of a PSRA entry to which the valid bit corresponds. Each entry in the first tag portion stores a retired most recently updated (RMRU) age of the predicted subroutine return address stored in the corresponding entry of the predicted subroutine return address portion 306. Each entry in the second tag portion 304 stores a speculative most recently updated (SMRU) age of a predicted subroutine return address stored in the corresponding entry of the subroutine return address portion 306. In the embodiment of the present invention described herein, the RAC is a fully associative cache with 8 lines starting from line 0 to line 7. The invention is not restricted to that cache organization.

Figure 4:
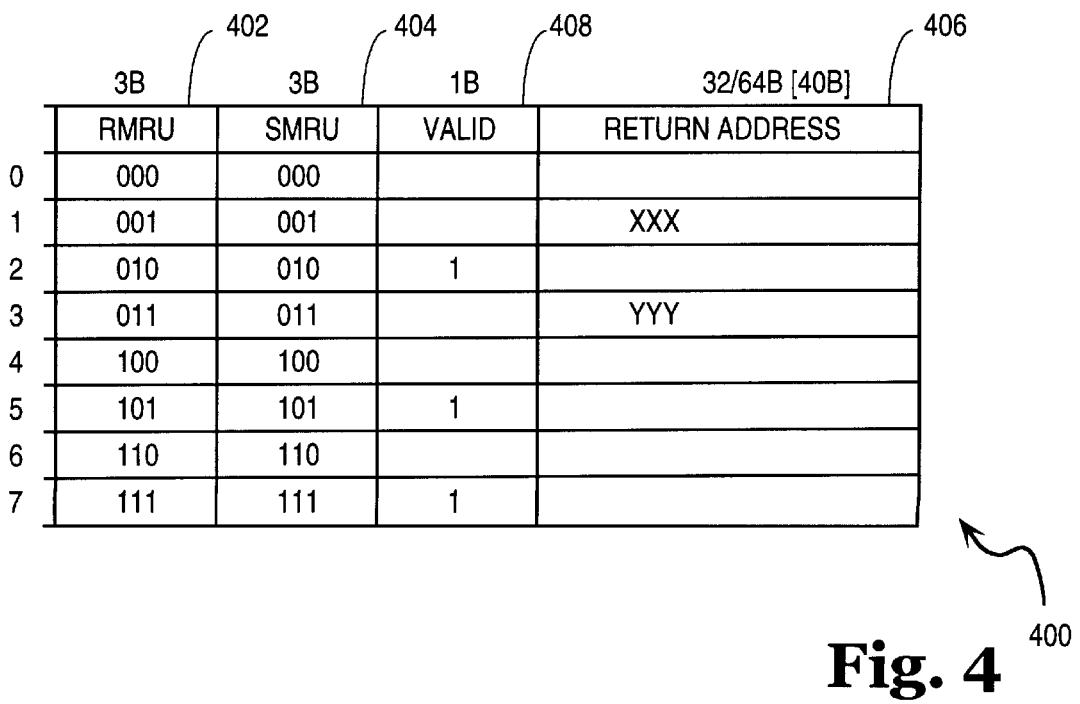
FIG. 4 illustrates a configuration of a RAC after the RAC has been initialized according to one embodiment of the present invention.

The RMRU and SMRU portions of the RAC 300 are each initialized to non-repeated values from 000 to 111 as illustrated in FIG. 4. The values in the SMRU and RMRU portions which represent the ages of the predicted subroutine return addresses stored in the subroutine return address portion 406, are non-repeated. In each portion, RMRU or SMRU, the values in lines 0 to 7 are all different from each other. While the values in the SMRU and RMRU are non-repeated for each line, upon initialization, when the RAC is reset on each line, the values of the RMRU coincide with the values of the SMRU. Also upon initialization, the values of the valid bit are reset to zero. The valid bit is cleared because the predicted subroutine return addresses may contain invalid information.

Figure 5:
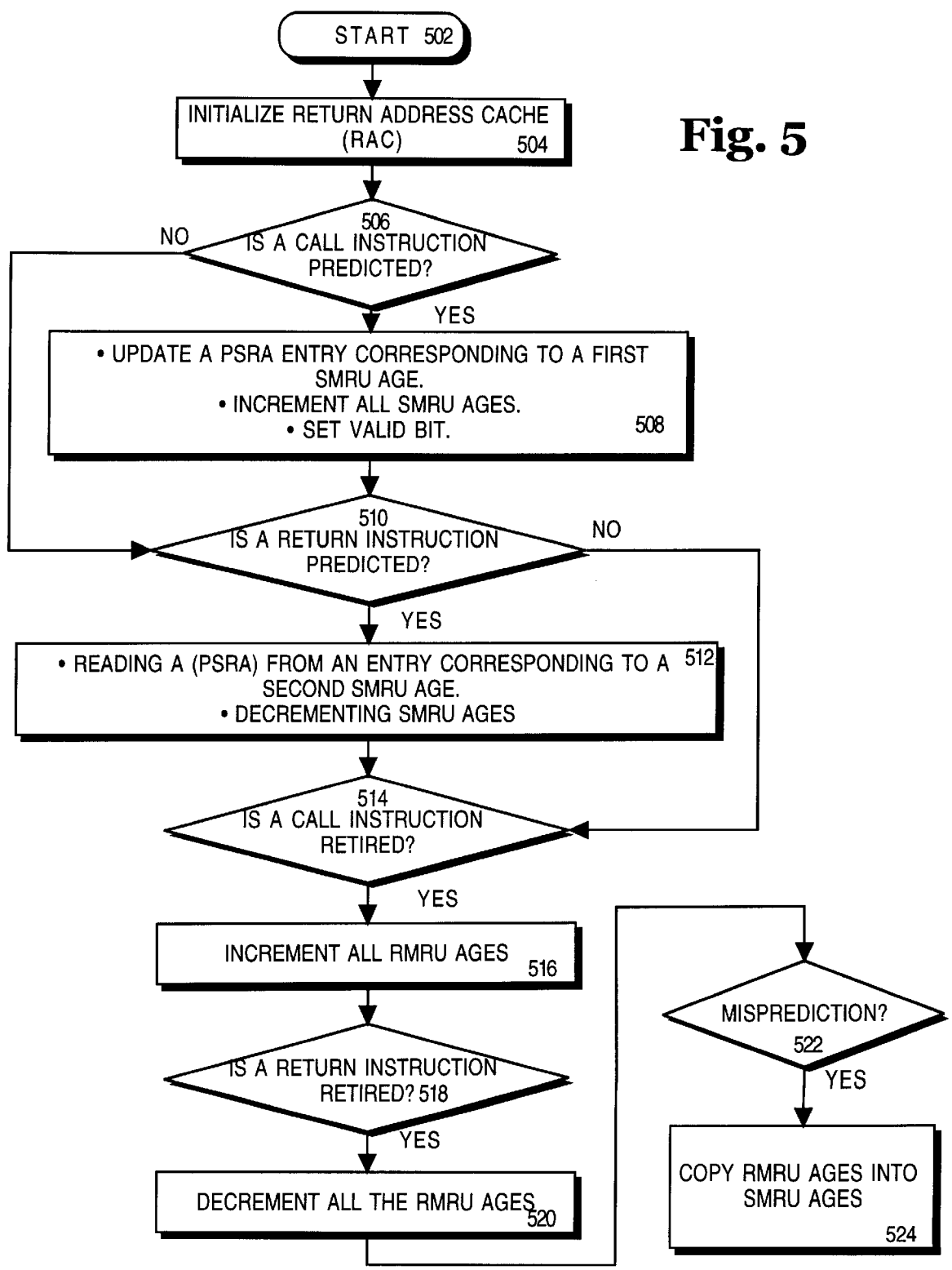
FIG. 5 illustrates a flow chart diagram in connection with a process for providing predicted subroutine return addresses according to one embodiment of the present invention.

The RAC illustrated in FIGS. 2,3 and 4, may be used in connection with a process for providing predicted subroutine return addresses according to one embodiment of the present invention. FIG. 5 illustrates a flow chart diagram in connection with a process for providing subroutine return addresses according to one embodiment of the present invention. The process 500 starts at block 502 from where it passes to block 504. At block 504, upon reset the return address cache (RAC) is initialized. The RMRU and SMRU tag portions are initialized with non-repeated values from 000 to 111 as shown in FIG. 4. Each entry of the RMRU is equal to an entry of the SMRU located on the same line i.e., corresponding to the same predicted subroutine return address (PSRA). All the entries of the RMRU are different therebetween. All the entries of the SMRU are also different therebetween. All valid bits for all the PSRA entries, are cleared. A misprediction bit (not shown) is cleared for the whole array of the RAC. This bit indicates whether there is a misprediction in connection with one of the PSRA entries in the cache.

From block 504 the process flows to decision block 506 where it is determined if a call instruction was predicted. If a call instruction is not predicted, the process flows to decision block 510 that will be explained later in this section. If a call instruction is predicted, the process flows to block 508 where a PSRA entry, corresponding to a first SMRU age, is updated. The PSRA entry stores the address where the subroutine, that has been called most recently, will return. In the embodiment of the present invention described herein, the first SMRU age is the youngest SMRU age, i. e., the lowest of the SMRU entries. After the updating of the PSRA entry, all SMRU ages are incremented by one. Also, the valid bit for the allocated entry i.e., for the PSRA entry that was updated due to the call, is set.

In one embodiment of the present invention, the first predicted SMRU age is chosen to be 000. Therefore the predicted subroutine return address, which is the address of the instruction following the predicted call instruction, is stored in the PSRA entry corresponding to the SMRU tag entry equal to 000. Since after updating all SMRU ages are incremented by one, the SMRU age 111, which is the oldest age, becomes 000 and the PSRA entry corresponding thereto will be the next PSRA entry to be updated, i.e., will store the next PSRA upon a next predicted call. While all the entries in the SMRU tags are incremented by one, these entries are still different from each other as they were different from each other before they were all incremented by one. On the next call, the same process applies, i.e the address of the instruction following the predicted call instruction is stored in the PSRA entry corresponding to SMRU tag 000. Then all SMRU tags are incremented by one and the valid bit is set for the updated entry.

The process then flows to decision block 510 where it is determined whether a return instruction is predicted. If a return instruction is predicted, the process flows to block 512 where the following operations are performed. A PSRA is read from a PSRA entry corresponding to a second predetermined SMRU age. In one embodiment according to the present invention the second age is the youngest updated age, i. e., 001. Accordingly, the return address is read (retrieved) from the PSRA entry corresponding to the SMRU tag entry 001. After the PSRA is read out, all entries of the SMRU are decremented by one.

Before reading the PSRA corresponding to the SMRU entry 001, the valid bit is checked to determine whether the PSRA data is valid. If the valid bit is set, the entry corresponding to SMRU 001 is read out and used for subroutine return target prediction. After reading out the PSRA data corresponding to the 001 SMRU age, the valid bit is reset for the entry corresponding to SMRU age 001 to prevent underflow. If, upon checking the valid bit, it is determined that the valid bit is not set, an underflow is detected and several actions may be taken. Among these actions we note: not performing the prediction for the return instruction; stopping the fetch of instructions; and powering down blocks in the front end of the microprocessor. The underflow situation is described in more detail later in this section.

The process then flows to decision block 514 where it is determined whether a call instruction was retired. If a call instruction was retired, all RMRU tag entries are incremented by one at block 516. The process then flows to decision block 518 where it is determined whether a return instruction is retired. If a return instruction is retired the RMRU ages are decremented by one at block 520. The process then flows to block 522 where it is determined if a misprediction occurs. If a misprediction occurs, the process flows to block 524 where the RMRU ages are copied into corresponding SMRU entries. A control logic 253 (shown in FIG. 2) causes the RMRU ages to be copied into corresponding SMRU entries. Note that the RMRU ages reflect the status of the retired, most recently updated PSRA entries. Instructions are retired after they are executed. After instructions are executed, one may determine whether a branch misprediction occurred or not. Accordingly, the RMRU ages reflect architecturally correct ages as they are updated after one has determined whether a branch misprediction occurred or not.

The RMRU ages are copied onto corresponding SMRU entries because from the point a misprediction is detected, the SMRU ages are most likely wrong. The mispredicted branch causes the flow of instructions to most likely go to a wrong place and to speculatively fetch instructions from the wrong place. Among the instructions, specifically fetched from the wrong place there may be "call" and "return" instructions that may cause incorrect RAC update. When the mispredicted branch arrives to the end of the pipeline, where this branch is detected to be a misprediction, the return address cache receives a signal that indicates that the speculative SMRU are wrong. The signal also instructs the RMRUs to copy themselves onto corresponding SMRUs. The pipeline is then flushed and the results that are in the pipeline are discarded. A branch misprediction causes a flush of everything that is speculative, including the SMRU ages. Fetching instructions then starts from the correct address. Without the mechanism according to the present invention, where the RMRU portion of the RAC is copied onto the SMRU portion, one would have a large number of return mispredictions and therefore a relatively long time would be wasted due to flushing of the pipeline numerous times. The process described in connection with the flow chart diagram illustrated in FIG. 5 may be implemented in a control unit (state machine) that controls the operation of the RAC.

In one embodiment the process according to the present invention may detect underflow and/or overflow. For example, in the case of the RAC of the present invention described in connection with FIGS. 3 and 4 where the RAC has 8 lines, the 9th consecutive call will overflow and override whatever was written in a subroutine return address entry when the first call occurred. In this case, the overflow may be detected because the PSRA entry, where data in connection with the 9th call is to be written, has its valid bit set.

In the case where more than 8 consecutive returns occur, all 8 valid bits corresponding to the 8 entries of the RAC are cleared. Upon the 9th consecutive return, the system detects a valid bit cleared to 0 for the entry which is believed to store the predicted return address in connection with the 9th return. Therefore, an underflow may be detected.

FIGS. 6, 7, 8, 9 and 10 illustrate various configurations of a return address cache (RAC) according to the present invention in connection with prediction of return addresses. FIG. 6 illustrates allocation of a RAC entry of the RAC 600 when a call was predicted. When the call was predicted, the SMRU entries of the SMRU portion 604 are incremented by 1, the valid bit corresponding to the predicted return address entry that was allocated is set to 1, and the return address entry is written with the predicted return address (represented by X).

FIG. 7 illustrates an updated RAC of FIG. 6 in the case where the call retires before the return is predicted. In this case it is assumed that the subroutine is relatively long, i.e., longer than the number of the instructions that may get into the pipeline. The call instruction therefore gets to the back end and retires before the subroutine finishes executing all its instructions and the return address is predicted. When the call gets to the back end it retires and the RMRU portion is incremented by 1 as one may see in portion 602. The RMRU entries therefore become equal to the SMRU entries in portion 604.

FIG. 8 illustrates the configuration of the RAC when the return is predicted. When the return is predicted all the SMRU entries are decremented by 1 as one may see in portion 602 of the RAC. Also, the valid bit for the first entry is cleared. The return address (X) may be used for prediction. The configuration of the RAC of FIG. 8 may change into either the configuration illustrated in FIG. 9 or the configuration illustrated in FIG. 10.

FIG. 9 illustrates the configuration of the RAC after the return retires and the predicted return was found to be a correctly prediction. In this case all the RMRU entries are decremented by 1 and these entries become equal to the corresponding SMRU entries, i.e., the SMRU entries located in the same lines with the RMRU entries.

FIG. 10 illustrates the configuration of the RAC where a branch is mispredicted. This may occur, for example, in the case where there is a branch inside the subroutine that is mispredicted. In the case of a misprediction, as explained above in connection with the flow chart of FIG. 5, a flash copy is performed where the RMRU entries are flash copied into the corresponding SMRU entries. In this case, the SMRU entries are identical with the RMRU entries but are different from the SMRU entries of FIG. 8.

FIGS. 11, 12, 13 and 14 illustrate various configurations of the RAC after a call prediction where the return is predicted before the call retires. This case corresponds to the case where the subroutine is a short subroutine. In FIG. 11 when the return is predicted, all SMRU entries are decremented by 1 and the valid bit is cleared.

When the call retires, in FIG. 12, all RMRU entries are incremented by 1. When the return retires and the prediction was correct, in FIG. 13, all the RMRU entries are decremented by 1. However, in the case of a misprediction, the RMRU entries are flash copied onto the SMRU entries as illustrated in FIG. 14.

In the previous detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. In a pipelined microprocessor, a method of operation, the method comprising:
  a. initializing a Return Address Cache (RAC) that includes a portion to store predicted subroutine return addresses (PSRA) and first and second corresponding cache portions to store retired most recently updated (RMRU) ages and speculative most recently updated (SMRU) ages of said PSRA respectively;
  b. storing a PSRA in a portion of the RAC corresponding to a first SMRU age and incrementing the SMRU ages responsive to prediction of a call instruction; and
  c. reading a PSRA from a portion of the RAC corresponding to a second SMRU age and decrementing the SMRU ages responsive to prediction of a return instruction.

2. The method of claim 1 further including incrementing said RMRU ages responsive to retirement of a call instruction.

3. The method of claim 2 further including decrementing said RMRU ages responsive to retirement of a return instruction.

4. The method of claim 3 further including copying said RMRU ages into corresponding SMRU ages responsive to detection of branch misprediction.

5. The method of claim 1 wherein initializing includes storing in said first cache portion RMRU ages that are different from each other and storing in said second cache portion SMRU ages that are different from each other, corresponding RMRU and SMRU ages equal.

6. The method of claim 1 wherein initializing further includes invalidating, for each PSRA entry, a bit corresponding to said PSRA, said bit indicating, when set, that said corresponding PSRA is valid.

7. The method of claim 6 wherein storing a PSRA includes setting said bit.

8. The method of claim 6 further, including prior to reading a PSRA, determining whether said bit is set.

9. The method of claim 1 further including detecting occurrence of overflow.

10. The method of claim 9 wherein occurrence of overflow detected by determining whether a PSRA entry, to be next written to, is valid.

11. The method of claim 10 wherein determining whether a PSRA entry to be next written to is valid includes, checking whether a bit, corresponding to said PSRA entry, is set.

12. The method of claim 1 further including detecting occurrence of underflow.

13. The method of claim 12 wherein occurrence of underflow is detected by determining whether a PSRA entry to be next read from is invalid.

14. The method of claim 13 wherein determining whether a PSRA entry to be next read from is invalid includes checking whether a bit, corresponding to said PSRA entry, is cleared.

15. A microprocessor comprising:
  a return address cache (RAC) comprising first and second tag portions, to store retired most recently updated (RMRU) ages and speculative most recently updated (SMRU) ages, respectively, and a data portion to store predicted subroutine return addresses (PSRA), said RAC including a control logic to cause said RMRU ages to be copied onto corresponding SMRU ages responsive to detection of a branch misprediction.

16. The microprocessor of claim 15 wherein said RAC includes a valid bit portion to store a bit for each PSRA entry, each valid bit, when set, indicating whether a PSRA corresponding thereto is valid.

17. The microprocessor of claim 15 wherein said control logic configured to cause storage of a PSRA in an entry corresponding to a first predetermined SMRU age and to increment the SMRU ages responsive to prediction of a call instruction.

18. The microprocessor of claim 15 wherein said control logic causes reading of an entry corresponding to a second SMRU age and decrementation of the SMRU ages responsive to prediction of a return instruction.

19. The microprocessor of claim 15 wherein said control logic causes incrementation of the RMRU ages responsive to retirement of a call instruction.

20. The microprocessor of claim 15 wherein said control logic causes decrementation of the RMRU ages responsive to retirement of a return instruction.

21. A microprocessor comprising:
  a return address cache (RAC) device comprising first and second tag portions that store retired most recently updated (RMRU) ages and speculative most recently updated (SMRU) ages, respectively, and a portion that stores predicted subroutine return addresses (PSRA);
  a branch prediction unit (BPU) to predict the plurality of branch instructions and to store a PSRA in the RAC after it predicts a call instruction; and
  said RAC including a control logic to control operation of said RAC, said control unit causing said RMRU ages to be copied onto corresponding SMRU ages when a branch misprediction is detected.

* * * * *